Nov. 16, 1965  J. F. BABBITT ETAL  3,217,472
FILTER FOR GASEOUS FLUIDS

Filed July 5, 1962  4 Sheets-Sheet 1

INVENTORS
JOHN F. BABBITT
OSCAR A. WURTENBERG

BY  W. E. Sherwood
ATTORNEY

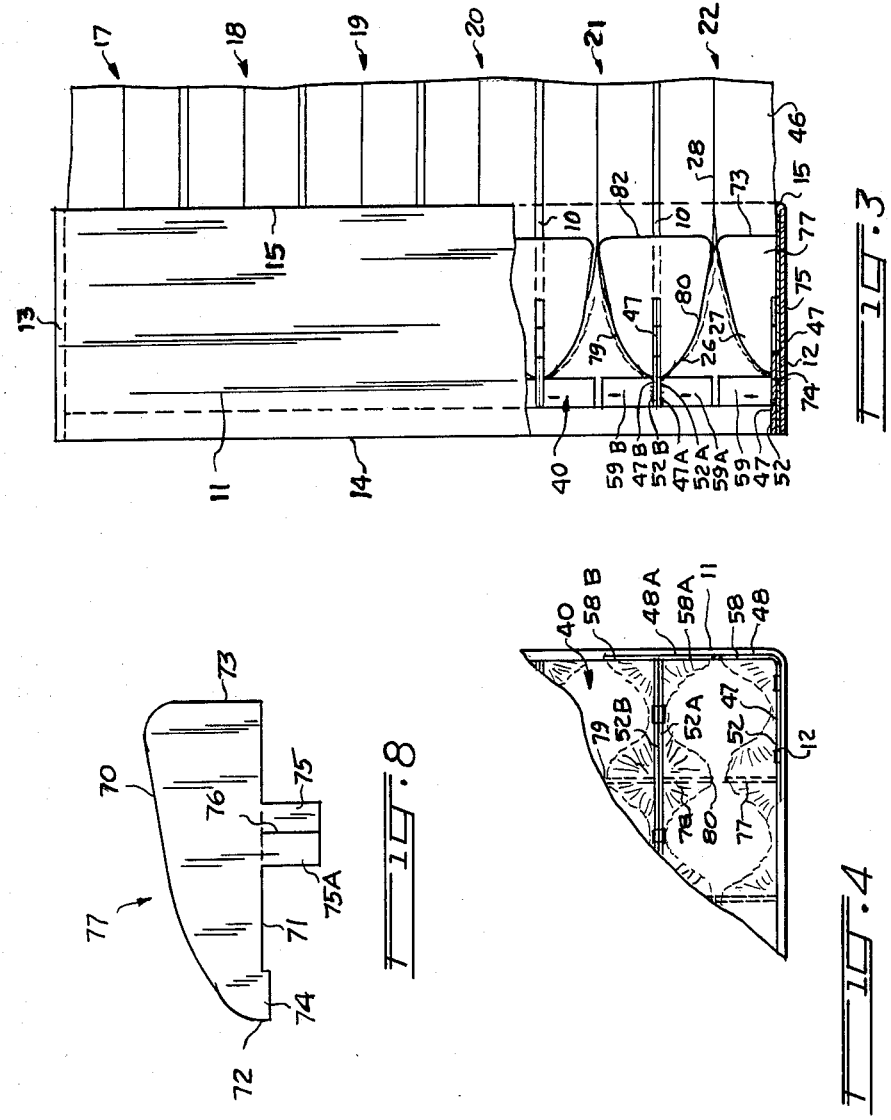

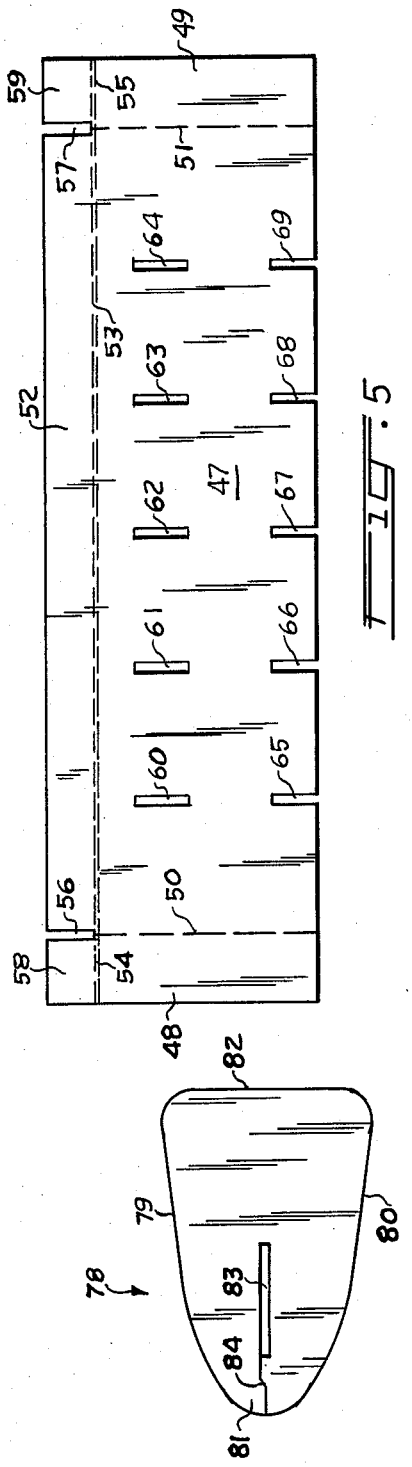

Nov. 16, 1965  J. F. BABBITT ETAL  3,217,472
FILTER FOR GASEOUS FLUIDS
Filed July 5, 1962  4 Sheets-Sheet 4

INVENTORS
JOHN F. BABBITT
OSCAR A. WURTENBERG

BY  W. E. Sherwood
ATTORNEY

United States Patent Office 3,217,472
Patented Nov. 16, 1965

3,217,472
FILTER FOR GASEOUS FLUIDS
John F. Babbitt and Oscar A. Wurtenberg, Louisville, Ky., assignors to Continental Air Filters, Inc., Louisville, Ky., a corporation of Delaware
Filed July 5, 1962, Ser. No. 207,742
4 Claims. (Cl. 55—341)

This invention relates to filters for removing dust and other foreign particulate matter from air or gas streams, and more particularly to a modified bag or sack type of filter for such usage.

The advantages of bag type filters in effecting a high ratio of filter medium area to duct face area are well known; but, before these advantages can be realized, provision must be made for mounting and retaining the several bags in their optimum positions and for assuring that the bags will be properly distended during their filtering performance. These structural requirements frequently give rise to turbulence of the gas, entrance loss of the pressure head of the gas, erosion of the filter medium, and unsatisfactory resistance values for the filter as a whole. It is these and other disadvantages of the conventional types of such filters which it is a purpose of the present invention to overcome.

An object of the invention is to provide an improved high-efficiency filter for gaseous fluids containing a filter element of novel shape, construction, and mounting.

Another object is to provide an improved high-efficiency filter for gaseous fluids characterized by its comparatively low resistance, low turbulence, and low nozzle loss of pressure head.

Another object is to provide a bag-type filter which may be efficiently stored or shipped in collapsed and protected form.

A further object is to provide a relatively inexpensive filter for gaseous fluids which is expendible as a unit and which may be readily destroyed after serving its intended filtering purposes.

Other objects and advantages will become apparent as the description proceeds and when considered in conjunction with the accompanying drawings in which:

FIG. 3 is a side elevation view of the filter to a larger scale, with parts broken away, and showing the relative locations of the spacers, support members, and frame.

FIG. 4 is a front elevation view of one corner portion of the filter shown in FIG. 3 and with parts broken away.

FIG. 5 is a plan view of a blank from which the filter element support member is formed.

FIG. 6 is a side elevation view of the folded support member.

FIG. 7 is a plan view of the center spacer shown detached from the support member.

FIG. 8 is a plan view of the end spacer shown detached from the support member and the frame.

Figure 9:
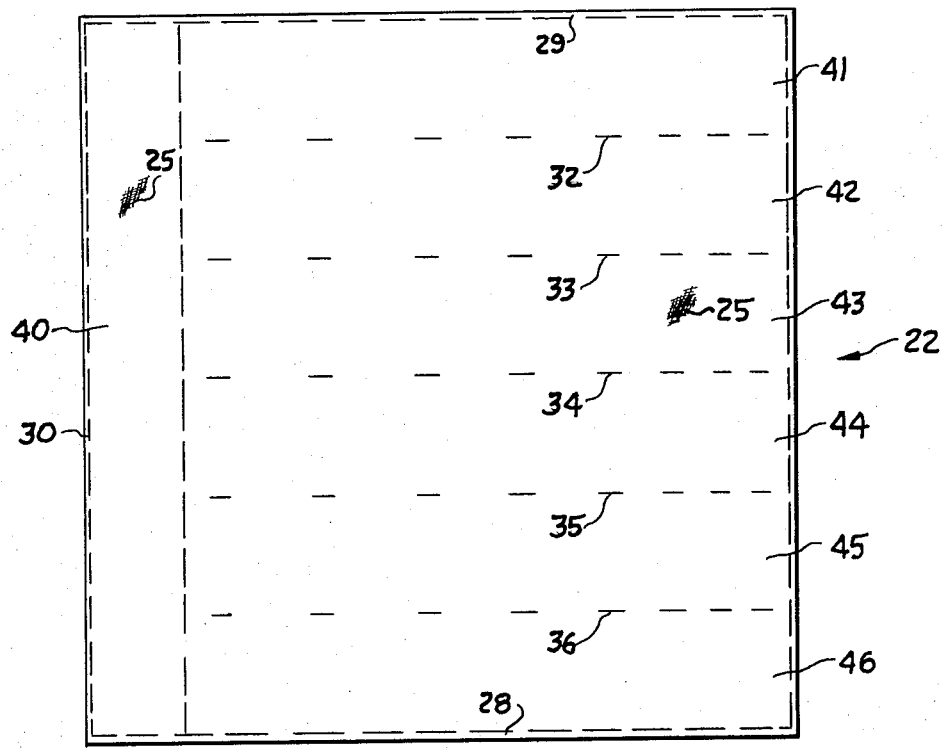
Figure 10:
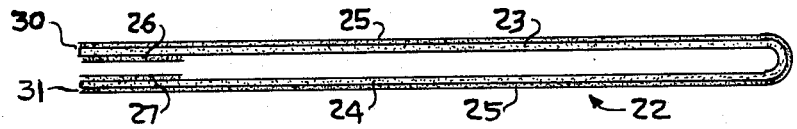

FIG. 9 is a plan view of the filter medium sack used in one modification of the invention and prior to its installation upon the frame and support members, and FIG. 10 is a diagrammatic side elevation view of the filter sack and its relation to the supplementary backing and protective netting. As used herein, the terms "downstream" and "upstream," as applied to the filter sack and its supporting parts when removed from the duct, signifies the functional relation of the ends and surfaces of the filter to the gas flow therethrough when it is mounted in that duct. For example, the upstream end of the filter denotes that end of the filter which first encounters the gas stream, and the upstream surface of the filter denotes the surface thereof which is in contact with the unfiltered gas.

In accordance with the invention, the filter includes a generally rectangular open-ended frame which is adapted for removable positioning in a duct and with a plurality of separate filter elements attached at their upstream ends to a mounting means which is secured to the interior of that frame. These elements, hereafter described as "glove-like" elements, preferably comprise a gas-pervious sack subdivided into a plurality of elongated bag portions closed at the downstream ends, and having a manifold portion at the upstream end communicating the entrances into each of the bag portions with each other and at a location upstream of the regions at which the bag portions assume their separate identities. Filter element spacing means interposed between the frame and the downstream surfaces of the sacks, in the regions intermediate the manifolds and subdivided bag portions of those sacks, serve to shape as well as to afford further support to the filter elements. Gaseous fluid passing through the filter accordingly flows smoothly from the duct into the manifolds of the filter elements and from those manifolds into the subdivided bag portions.

Figure 1:
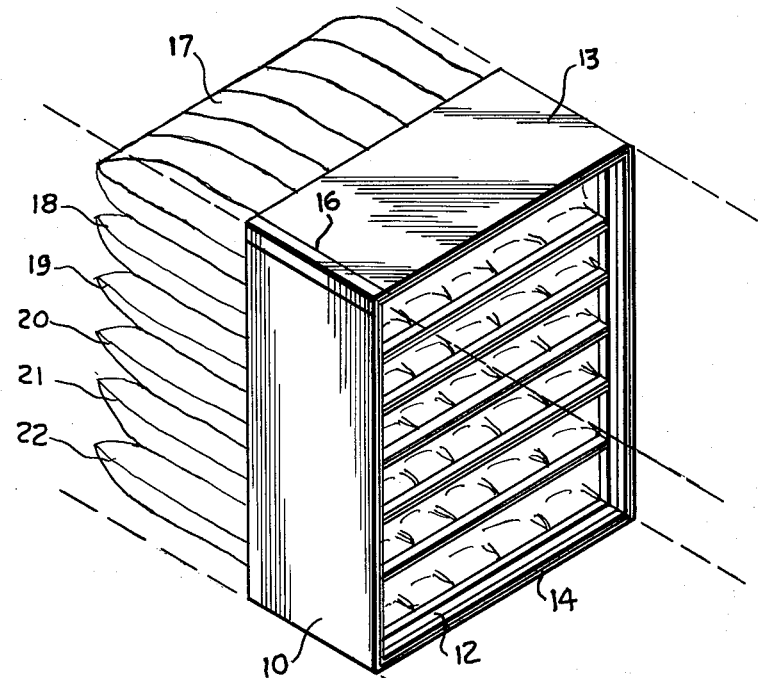
FIG. 1 is a perspective view of the filter shown in operative position within an air duct as indicated by dotted lines.
Figure 2:
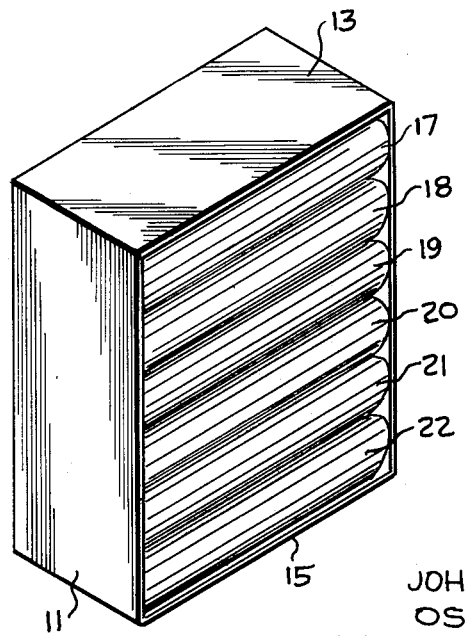
FIG. 2 is a perspective view of the rear of the filter shown in collapsed form for shipping.

Referring now to FIGS. 1 and 2, the frame conveniently comprises a single piece of two-ply corrugated paperboard folded upon itself and bent at the corners to form a rectangular shaped structure having side walls 10, 11, 12 and 13 and with an upstream edge 14 and a downstream edge 15. A suitable sealing strip 16 at one corner is employed to hold the frame in its rectangular shape, and as a feature of the invention the length of the frame is comparatively short with respect to the overall length of the filter when in operative condition. This frame length, however, is sufficiently long to provide for housing the filter elements in collapsed rolled form during storage as indicated by the rolled filter elements 17, 18, 19, 20, 21 and 22 shown in FIG. 2. Suitable cap members or covers, not shown, may be engaged around the open ends of the frame in contact with the respective edges 14 and 15 for protection of the filter when being shipped or stowed. As an example, it has been found that when employing a filter element having a length of 36 inches, a frame length of 12 inches is sufficient for this collapsibility feature as well as for positioning of the filter-element-mounting means and the filter-element-spacing means, later to be described.

Passing now to FIGS. 9 and 10 wherein a preferred form of filter element 22 is depicted, such an element may comprise a gas-pervious sheet of filter medium formed of fluffy glass fibres suitably matted together and folded upon itself to provide a first filtering surface 23 and a second filtering surface 24. A single sheet of nylon net backing 25 is disposed around the filter medium on its downstream surface and a pair of short strips 26 and 27 of this net is interposed between the upstream edges of the filter medium and on the upstream surface of the same. Such netting provides additional tensile strength for the filter element and serves to limit abrasion of the fragile medium during handling. Also it aids in preventing erosion of the medium by the incoming gas and in retaining particles of the medium which flake off the filter during use. By means of suitable strips of adhesive material or other fastening materials shown at side edges 28 and 29 and at the upstream edges 30 and 31, the described parts are fashioned into a sack.

Extending upstream from the closed end of this sack are a number of parallel spaced rows of bag-defining means indicated at 32 to 36 and which may comprise stitching, strips of adhesive, stapling, or the like. These rows terminate at a sufficient distance from the upstream edge of the sack to provide a manifold space 40 and between adjacent rows and the side edges of the sack an array of pockets or bag portions 41 to 46 thus are formed, thereby giving to the sack a general glove-like configuration. We prefer to employ small staples as the bag-defining means and to space the same progressively closer together within each line thereof as they approach the closed end of the sack. While for reasons of economy the preferred filter-element is disclosed as being formed as a sack with these bags or "finger" portions being integral with adjacent portions it will be understood that the invention comprehends the use of such elements in which each bag or finger portion is separated from the others along their sides and in the manner found in conventional gloves.

In order to employ the described glove-like sack for its intended use, an appropriate means for mounting the same upon the frame is required, and such filter-element-mounting means conveniently comprises a pair of cooperating thin stiffeners, or support members, one of which is shown in FIGS. 5 and 6. A flat blank of strong paperboard having a main body portion 47 and end tabs 48 and 49 attached to the main body along bend lines 50 and 51 is provided. A side tab 52 attached to the main body along bend line 53 and to the end tabs along bend lines 54 and 55 beyond cut-away slots 56 and 57, defines corner tabs 58 and 59 and serves to permit the stiffener to be bent and folded into the channel shape seen in FIG. 6.

When so bent into this channel shape the stiffener receives approximately one-half of the periphery of the upstream edge of the sack which is secured, as by adhesive, between the folded over tabs; two cooperating stiffeners serving to secure the entire periphery of the sack.

Referring now to FIGS. 3 and 4, it will be seen that when the filter element 22 is ready for mounting in the frame, all that is required is the stapling of the main body 47 and folded side tab 52 of one stiffener to the wall 12 of the frame and the stapling of the folded end and corner tabs to the respective walls 10 and 11 of that frame. At the same time the cooperating stiffener, shown with suffixes, A, in FIGS. 3 and 4, has its folded end and corner tabs affixed to the frame walls 10 and 11 and its folded side tab 52A affixed by staples to the immediately adjacent filter element stiffener shown with suffixes, B, and supporting the filter element 21. These stiffeners serve not only to mount the filter elements, but also to give transverse rigidity to the frame. As a significant feature, the stiffeners also provide a firm grip upon the upstream peripheral edge of the sack and hold the manifold portion of the sack in fully opened position at all times. Due to the thin nature of these stiffeners, moreover, no material obstruction is offered to the incoming gas such as would be found with the mounting of filter elements upon perforated plates extending transversely across the frame.

Further to employ the described glove-like sack for its intended use, an appropriate means for spacing the same within the confines of the frame is required and that spacing means convenieently comprises the end and center spacers now to be described. As shown in FIG. 5, the body portion of the stiffener may be formed with an array of rectangular apertures extending axially of the frame and corresponding in number to one less than the number of bag portions in the sack and located inboard of the edges of that stiffener as seen at 60 to 64. Along the downstream edge of the stiffener and extending toward those apertures, a series of corresponding slots 65 to 69 open at one end are positioned.

End spacers for interposition between the walls 12 and 13 of the frame and the filter elements adjacent thereto preferably are of the form shown in FIG. 8 and include a flat plate of strong paperboard having an arcuate inner edge 70, a mounting edge 71, a relatively short upstream edge 72 and a relatively long downstream edge 73. Projecting from the lower edge adjacent the upstream edge is a short key portion 74 adapted to engage in a corresponding aperture in the stiffener. Also projecting from the lower edge at a location suitable for close engagement in a slot in the edge of that stiffener is a long tab having portions 75 and 75A separated by a cut line 76. Accordingly, when an end spacer 77, as seen in FIG. 3, is inserted in place in the stiffener body 47, the tab portions 75 and 75A may be bent in opposite direction and be folded under the stiffener body 47, and secured thereto as well as to the surface of wall 12 with adhesive, while at the same time the key portion engages with the aperture in that stiffener. When so positioned, that end spacer as indicated in FIG. 4, serves to define a partial entrance wall shaping the filter medium, thereby to guide in its passage from the manifold portion of the sack toward a subdivided bag portion of that same sack, the gaseous fluid to be filtered.

Cooperating with the thus described end spacer is a center spacer 78 as indicated in FIG. 7 and comprising a flat piece of strong paperboard having a pair of arcuate side edges 79 and 80 extending from a relatively short upstream nose portion 81 to a relatively long downstream edge 82. This spacer is provided with a slot 83 having a length equal to the distance between confronting edges of the respective aperture 60 and corresponding slot 65 of the stiffener and with a width equal to the thickness of that stiffener. A non-linear cut 84 extends from the forward end of the slot 83 to the nose of the spacer thus permitting the spacer to be emplaced within slot 65 of the stiffener when the nose portions are shifted along that cut line. When the spacer is thus emplaced as seen in FIGS. 3 and 4, the nose portion fits within the aperture 60 of the stiffener and both longitudinal and transverse shifting of the center spacer with respect to that stiffener is prevented. As will be understood, a center spacer lies in the same plane as the end spacer, or other center spacer with which it cooperates, and serves to define partial entrance walls shaping the filter medium of two filter elements, thereby to guide in its passage from the manifold portions of those elements toward the subdivided bag portions thereof, the gaseous fluid to be filtered. The interlocking of the center spacer with the stiffener is sufficient to hold this portion of the filter-element-spacing means in place without additional fastenings when the glove-like filter elements distend under pressure of the gas being filtered.

The plane in which the described cooperating center and end spacers are disposed also includes one of the rows of bag-defining means in each of the filter elements being shaped by the array of those spacers such as row 36 seen in FIG. 9. Thus when the filter is in operative position within the duct as seen in FIG. 1, pressure of the gas distends each of the bag portions, and as these bag portions assume their generally cylindrical form, their sides will be held away from the walls of the duct downstream from the filter frame, and the high ratio of filter medium area to duct face area characteristic of bag-type filters will be secured. Distention of the bag portions of each of the adjacent layers of filter elements, however, is not sufficient to cause bags in different layers to contact each other and as seen in FIG. 3 where the side wall 10 of the frame is visible, a space exists between those adjacent distended bags in the different layers.

As a significant feature, the downstream edges 73 and 82 of these spacers terminate a substantial distance upstream of the edge 15 of the frame thus leaving an unobstructed open space into which the rolled bag portions of the filter elements may be stowed in the manner shown in FIG. 2. Furthermore, we prefer to locate the stiffeners which support the upstream edge of the sacks, a short distance downstream from the edge 14 of the frame as best seen in FIG. 3 thereby to provide a plenum chamber into which the gas flows before it enters the several manifolds leading to the subdivided bag portions within each filter element. Conveniently the edge of one of the plies of cardboard forming the frame may be overlapped and bent inwardly to establish the length dimension of this chamber, a feature which also assists in assembling the stiffeners at their predetermined positions during assembly of the filter. Moreover, the plenum chamber affords a useful space for housing a prefilter element when such is desired in combination with the above described filter construction.

In various usages wherein an expendible filter which can be readily destroyed, as by burning, is desired, the present invention is particularly useful. By employing non-metallic fastening devices as by using adhesive or other means in lieu of stapling, a completely non-metallic filter may be made according to the invention and of combustible inexpensive components without sacrifice of strength or of filtering efficiency. Various other advantages will be apparent to those skilled in the art. For example, the curved noses of the spacers serve to shape the filter medium without abrupt changes of direction and the nets 26 and 27 which are fastened only at their upstream edges, can adjust themselves to the inner surfaces of that filter medium between the manifold and entrance regions into the bags. The presence of these nets affords a useful protection to the surface of the fragile filter medium in the areas where the gas increases velocity and where erosion may be expected. The interlocking of the spacers with the stiffeners may be readily accomplished and without damage to the filter elements. Many different shapes of those spacers may be employed without departing from the invention. As seen in FIGS. 3 and 4, the mutual reinforcing action of the spacers upon the medium and of the medium bearing upon the spacers will serve to retain the filter element assembly in its proper position. Moreover, since each filter element is identical and interchangeable with the others, but is self-contained, a simple process of assembly may be employed. The load sharing mounting afforded by the pair of channel shaped stiffeners for each sack is especially useful in that any pull or tug upon any one bag portion of a given filter element will be transmitted to the entire peripheral mounting of that element at its upstream edge rather than being localized around the mounting periphery of the bag portion receiving such a stress.

Having thus described our invention and its attendant advantages, it is intended that the appended claims are to cover such changes and modifications of the described invention as come within the true spirit and scope of the same.

What is claimed is:
1. In a gaseous fluid filter comprising a generally rectangular open-ended frame having sides adapted to fit removably into a duct, a plurality of glove-like filter elements mounted within said frame in side-by-side relation to each other and having a length substantially greater than the length of said frame, each of said elements comprising a gas-pervious sack having an open upstream end and a closed downstream end, said sack being subdivided into a plurality of elongated bag portions closed at said downstream end of said sack, said sack having a manifold portion at its upstream end communicating with each of said bag portions, a pair of complementary channel-shaped stiffeners for each filter element arranged in confronting relation to each other and attached to substantially the entire periphery of said upstream end of the respective sack, means for affixing said stiffeners to the side walls of said frame and to adjacent stiffeners within said frame thereby to provide rigidity to the assembled filter and to define the peripheral boundaries of said manifolds, a generally flat end spacer mounted between the bottom side of said frame and the side of the one filter element adjacent the bottom side of said frame, a generally flat center spacer mounted in the same plane as said end spacer and between said one filter element and the side of the filter element next adjacent said one filter element, and means for interlocking said spacers upon the pair of stiffeners attached to said one filter element, said interlocking means comprising an opening in each of said stiffeners, said opening extending parallel to the sides of said frame and a tab on each of said end and center spacers, said tab extending parallel to the sides of said frame and insertable in the corresponding opening of one of said stiffeners, thereby to mount said spacers as a filter-element-spacing means serving to shape said one filter element sack in the region intermediate the manifold and the subdivided bag portions thereof.

2. A filter as defined in claim 1 wherein each of said flat spacers includes an edge portion extending parallel to the sides of said frame and in contact with the filter element sack disposed between said end and center spacers, each of said edge portions having an arcuate nose facing toward the manifold portion of said sack and in contact with said sack.

3. A filter as defined in claim 1 wherein each of said spacers extends downstream beyond the stiffeners with which said spacers are interlocked.

4. A gaseous fluid filter comprising a generally rectangular open-ended frame having sides adapted to fit removably into a duct, a plurality of glove-like filter elements mounted within said frame in side-by-side relation to each other and having a length substantially greater than the length of said frame, each of said elements comprising a gas-pervious sack having an open upstream end and a closed downstream end, said sack being subdivided into a plurality of elongated bag portions closed at said downstream end of said sack, said sack having a manifold portion at its upstream end communicating with each of said bag portions, a pair of complementary channel-shaped stiffeners for each filter element arranged in confronting relation to each other and attached to substantially the entire periphery of said upstream end of the respective sack, means for affixing said stiffeners to the side walls of said frame and to adjacent stiffeners within said frame thereby to provide rigidity to the assembled filter and to define the peripheral boundaries of said manifolds, and filter-element-spacing means supported by said stiffeners within said frame and in contact with said sacks on the downstream surfaces of said sacks and serving to shape and support said sacks in the region intermediate the manifold and the subdivided bag portions of said sacks, each of said stiffeners including a plurality of openings formed therein and extending parallel to the sides of said frame for receiving a tab on each of said filter-element-spacing means, and each of said filter-element-spacing means including a tab extending parallel to the sides of said frame for insertion within a corresponding one of said openings thereby to provide for insertion and retention of said filter-element-spacing means within said filter following affixing of said stiffeners to said frame.

References Cited by the Examiner

UNITED STATES PATENTS

| | | | |
|---|---|---|---|
| 1,821,824 | 9/1931 | Woodward | 55—382 |
| 2,050,508 | 8/1936 | Strindberg | 55—500 X |
| 2,080,154 | 5/1937 | Strindberg | 55—500 |
| 2,327,225 | 8/1943 | Taylor | 55—380 X |
| 2,853,154 | 9/1958 | Rivers | 55—341 |
| 2,907,408 | 10/1959 | Engle et al. | 55—500 |
| 3,099,547 | 7/1963 | Hagendoorn et al. | 55—341 |

FOREIGN PATENTS

| | | |
|---|---|---|
| 557,683 | 11/1943 | Great Britain. |
| 407,561 | 11/1944 | Italy. |
| 136,461 | 7/1952 | Sweden. |
| 311,189 | 1/1956 | Switzerland. |

HARRY B. THORNTON, *Primary Examiner.*

ROBERT F. BURNETT, *Examiner.*